Jan. 20, 1953     L. J. WUBBE     2,626,002
TRACTOR DRIVE WITH TIRE DIRECTLY DRIVEN
Filed May 25, 1950     5 Sheets-Sheet 1

INVENTOR.
Leo J. Wubbe
BY
ATTORNEY

Jan. 20, 1953 L. J. WUBBE 2,626,002
TRACTOR DRIVE WITH TIRE DIRECTLY DRIVEN
Filed May 25, 1950 5 Sheets-Sheet 3

INVENTOR.
Leo J. Wubbe
BY
ATTORNEY

Jan. 20, 1953            L. J. WUBBE            2,626,002

TRACTOR DRIVE WITH TIRE DIRECTLY DRIVEN

Filed May 25, 1950            5 Sheets-Sheet 5

INVENTOR.
Leo J. Wubbe

BY

ATTORNEY

Patented Jan. 20, 1953

2,626,002

UNITED STATES PATENT OFFICE 2,626,002

TRACTOR DRIVE WITH TIRE DIRECTLY DRIVEN

Leo J. Wubbe, Detroit, Mich.

Application May 25, 1950, Serial No. 164,047

14 Claims. (Cl. 180—74)

This invention relates to automotive vehicles and particularly pertains to a small wheeled, gearless, power driven vehicle having an infinitely variable transmission for effecting graduated forward and reverse speeds.

Many small automotive vehicles have been heretofore developed such as motor scooters, motorcycles, and bicycles with power units, but these vehicles are limited to normally carrying one person and involve the essential characteristic of balancing on two wheels which renders them incapable of very slow speed or any reverse motion. Other small automotive vehicles such as small conventional automobiles have been developed which overcome the limitations of the two wheeled vehicles but they involve expensive conventional parts such as motors, transmissions, differentials, bodies, and brakes which render the resultant product excessively costly.

It is, therefore, the primary object of the invention to provide a small automotive vehicle which overcomes the limitations inherent in a two wheeled vehicle and which avoids the use of expensive conventional automotive units.

An object of the invention is to provide a vehicle approximately the length of a bicycle and substantially narrower than the usual small automobile.

An object of the invention is to provide an extremely light vehicle.

An object of the invention is to provide a vehicle capable of carrying two or more persons.

An object of the invention is to provide an extremely inexpensive stabilized automotive vehicle.

An object of the invention is to provide a small, inexpensive vehicle having a gearless transmission with variable forward and reverse speeds and a neutral position.

An object of the invention is to provide a spherically faced friction drive wheel variably engaging one of the ground wheels of the vehicle to impart motive power to the vehicle.

An object of the invention is to provide means for shifting the spherically faced friction drive wheel relative to the ground wheel to facilitate varying the ratio of the drive between the spherically faced drive wheel and the ground wheel.

An object of the invention is to provide a drive wheel having an independently freely bearinged center or non-driving area for contacting the ground wheel constituting the neutral position between the drive wheel and the ground wheel.

An object of the invention is to provide a non- variable driven wheel and a variable spherically-faced friction drive wheel pivotally mounted on a radius relative to the driver wheel substantially identical to the radius of the spherical face on the friction drive wheel.

An object of the invention is to provide hand controls capable of operating the entire vehicle for persons not having the use of their legs.

An object of the invention is to provide single means capable of disassociating the ground wheel from the drive wheel and capable of varying the driving ratio between the ground wheel and the drive wheel.

Other objects of the invention will become apparent by reference to the following description of a small automotive vehicle embodying the invention in connection with the accompanying drawings, in which.

Referring now to the drawing wherein like numerals refer to like and corresponding parts throughout the several views, the vehicle disclosed therein to illustrate the invention comprises a T-shaped frame, front steering and supporting wheels at either end of the frame cross member, a stabilized rear wheel, a friction wheel bearing on the rear wheel normally supporting the rear end of the vehicle and powering the rear wheel; means for varying the ratio and direction of drive between the friction wheel and the rear wheel, and means for supporting the rear end of the vehicle on the rear wheel independently of the friction wheel.

Figure 1:
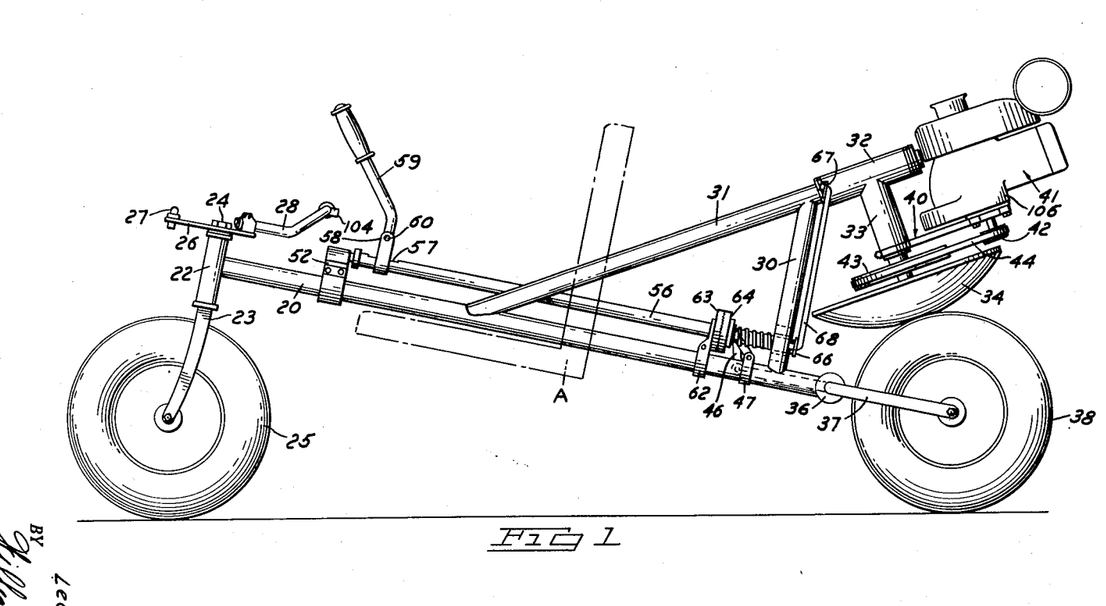
Fig. 1 is a side elevational view of a vehicle embodying the invention showing a seat arrangement in dotted lines and the spherical drive wheel contacting the ground wheel.
Figure 2:
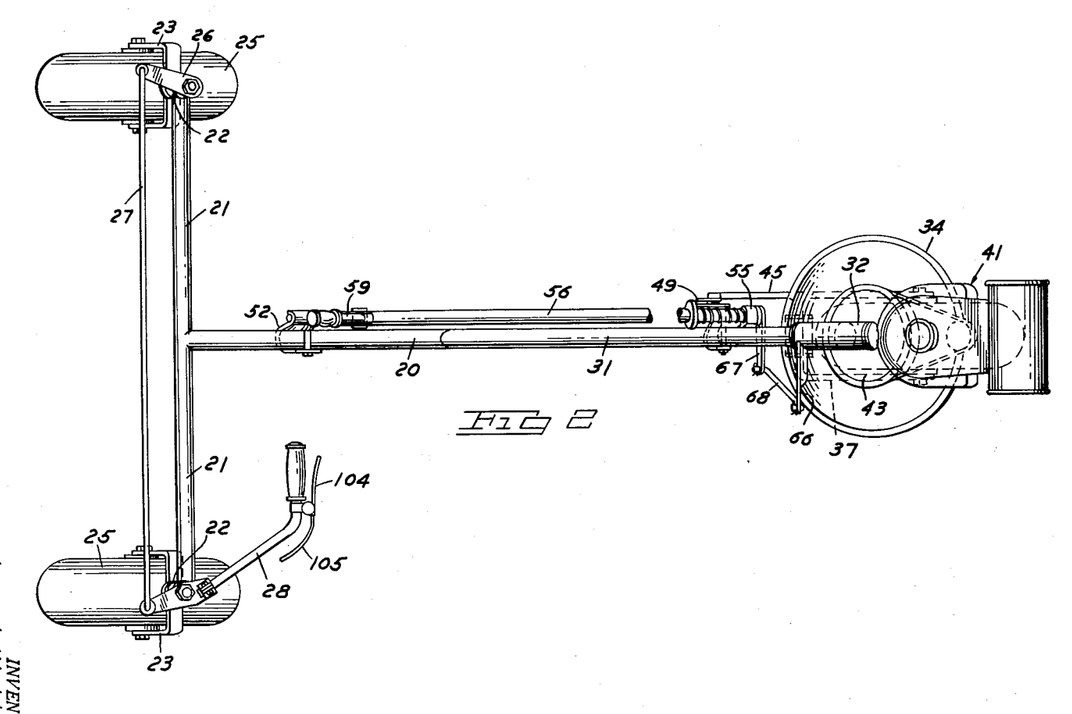
Fig. 2 is a top plan view of a vehicle as seen in Fig. 1.
Figure 3:
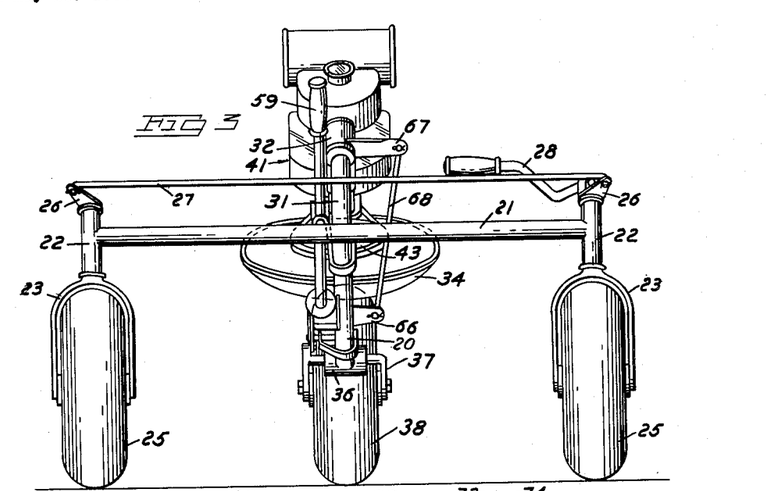
Fig. 3 is a front elevational view of the vehicle as seen in Fig. 1.

More particularly, Figs. 1 to 3, the inventive vehicle comprises a longitudinal frame member 20, a transverse frame member 21 at its forward end, steering forks 23 bearinged in the journals 22, nuts 24 securing the forks 23 in the journals 22, front ground wheels 25 rotatably mounted in the forks 23 supporting the forward end of the vehicle, steering arms 26 secured to the wheel forks 23 by the nuts 24, a tie rod 27 connecting the steering arms 26, and a steering hand lever 28 bolted to one of the steering arms 26 adapted to steeringwise control both the wheels 25 via the tie rod 27.

Figure 4:
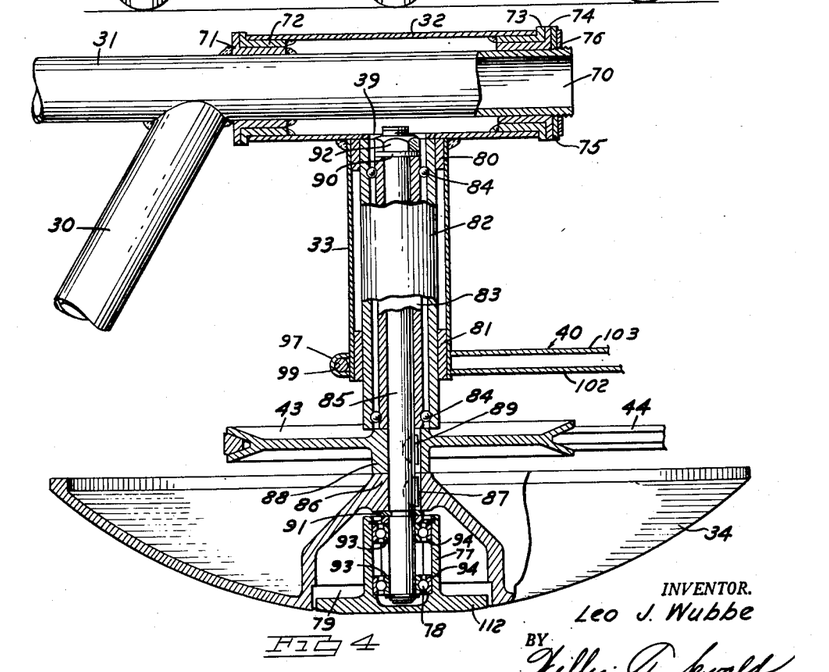
Fig. 4 is a side cross-sectional view, partly in elevation, of the spherically faced friction drive wheel and associated parts.

A vertical support member 30 is welded to the longitudinal frame member 20 at a point spaced from the rear end of the member 20 and a triangulating support member 31 is welded at its forward end to the longitudinal frame member in its central area and welded at a point spaced from the upper end of the member 31 to the upper end of the vertical support member 30. A support sleeve 32 having an aperture 39, Fig. 4, in its sidewall is pivotally mounted on the projecting end of the support member 31, a friction wheel sleeve 33 is welded at its upper end to the support sleeve 32, and a spherically faced friction drive wheel 34 is freely rotatably bearinged in the friction wheel sleeve 33.

A rear wheel fork journal 36 is welded on the rear end of the longitudinal frame member 20 with a rear wheel stabilizing fork 37 bearinged in the journal 36, and a rear wheel 38 is rotatably mounted on the fork 37 adapted to normally support the rear end of the vehicle via the friction wheel 34, the sleeve 33, the sleeve 32, and the projecting end of the support member 31 under certain conditions as hereinafter more fully explained. A motor support 40 is bolted to the sleeve 33, a motor 41 is mounted on the support 40, a small pulley 42 is connected to the motor 41, a large pulley 43 is connected to the friction wheel 34, and a belt 44 drivingly connects the pulleys 42 and 43.

Figures 5, 6, 7:
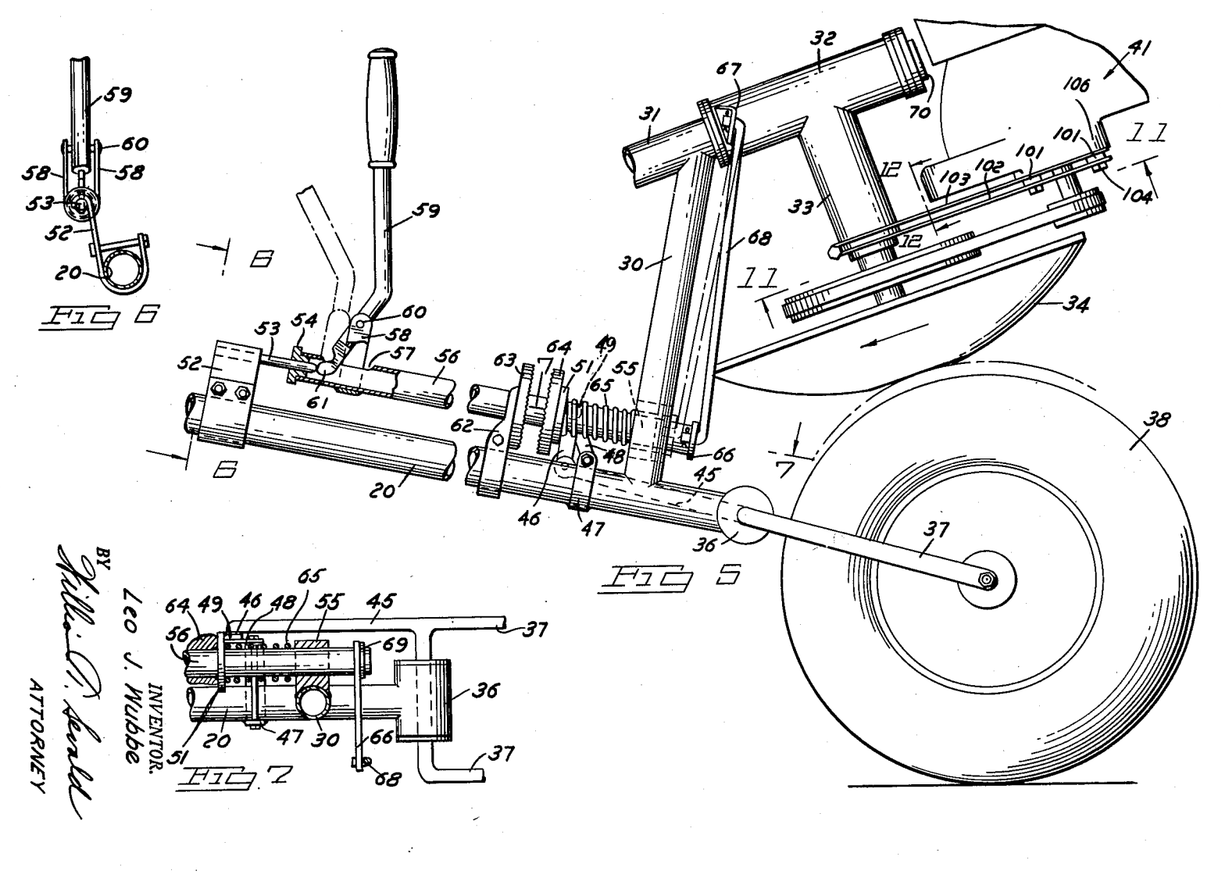
Fig. 5 is an enlarged side elevational view of the rear portion of the vehicle showing the elements of the vehicle in greater detail with the driving wheel and driven wheel shown in noncontacting relation to one another.
Fig. 6 is a cross-sectional view of the supporting structure and of the operating linkage taken on the line 6—6 of Fig. 5.
Fig. 7 is an enlarged top plan view of the rear portion of the operating linkage taken on the line 7—7 of Fig. 5.

A rear wheel fork lever 45, Figs. 2, 5, and 7, is connected to the rear wheel fork 37, a drag link 46 is pivotally connected to the end of the rear fork lever 45, a toggle link bracket 47 is welded to the longitudinal frame member 20, a toggle link 48 is pivotally mounted on the bracket 47 at one end and pivotally connected to the end of the drag link 46 at its other end, a roller 49 is disposed between the drag link 46 and the toggle link 48, a plate 51 bears against the roller 49 and is adapted to move longitudinally of the vehicle to cause the toggle link 48 to elevate the drag link 46 to lift the lever 45 and the rear end of the vehicle relative to the rear wheel 38 as hereinafter more fully explained.

Control rod front bracket 52 is bolted to the longitudinal frame member 20, a control rod front slide pin 53 is welded to the bracket 52 projecting rearwardly, a control rod front bearing 54 is slidably and rotatably associated with the pin 53, a control rod rear journal 55 is welded to the vertical support member 30, and a control rod 56 is mounted on the control rod front bearing 54 and slidably and rotatably bearinged in the control rod rear journal 55 supporting the toggle activating plate 51 which is welded thereon and having an opening 57 in its side wall adjacent the front bearing 54 and pin 53.

Clevis 58 is welded to the control rod 56 adjacent the opening 57, a control rod hand lever 59 is pivotally mounted and fulcrumed at 60 to the clevis 58, a ball-end 61 is located on the control rod hand lever 59 bearing against the end of the pin 53, a control rod stationary brake bracket 62 is bolted to the longitudinal frame member 20, a control rod stationary brake element 63 freely surrounds the control rod 56 mounted on the bracket 62, a control rod movable brake element 64 surrounds the control rod 56 and is welded thereto, a control rod spring 65 is under compression surrounding the control rod 56 positioned between the toggle activating plate 51 and the control rod rear journal 55 bearing against the rear journal 55 to urge the control rod 56 and hand lever 59 forwardly in the vehicle as shown by the solid lines of Fig. 1 and the dotted lines of Fig. 5 as hereinafter more fully explained.

Control rod arm 66 is keyed to the rear end of the control rod 56, a nut 69 secures the lever 66 on the control rod 56, Fig. 7, a support sleeve arm 67 is welded to the support sleeve 32, a connecting rod 68 links the control rod arm 66 and the support sleeve arm 67 transmitting rotational movement of the control rod 56 to the support sleeve 32 for varying the relation between the spherically faced friction wheel 34 and the rear ground wheel 38 as hereinafter more fully explained. A projecting end or stub 70 on the cross support member 31, Fig. 4, carries a stub inner bearing 71 welded to the stub 70, a support sleeve inner bearing 72 is secured to the support sleeve 32 riding on the stub inner bearing 71, a support sleeve outer bearing 73 is secured to the support sleeve 32, a stub outer bearing 74 is inserted between the stub 70 and the support sleeve outer bearing 73 for freely supporting the bearing 73, a washer 75 surrounds the stub 70 abutting the bearing 74, a nut 76 abuts the washer 75 and is locked in position by suitable means, an upper annular spacer 80 is fixedly disposed within the friction wheel sleeve 33 abutting the support sleeve 32, and a lower annular spacer 81 is fixedly disposed within the friction wheel sleeve 33.

Fixed intermediate sleeve 82 is disposed within the friction wheel sleeve 33 abutting the support sleeve 32 mounted on the spacers 80 and 81, a freely rotatably disposed inner sleeve 83 is disposed within the intermediate sleeve 82 opposite the aperture 39 in support sleeve 32, anti-friction ball bearings 84 are disposed between and supporting the inner sleeve 83 relative to the intermediate sleeve 82, a shaft 85 is fixedly disposed within the inner sleeve 83 and projects downwardly therefrom adapted to rotate therewith. An axial hub 86 on the spherically-faced friction drive-wheel 34 is keyed to the projecting end of the shaft 85 by a key 87, a pulley hub 88 is disposed on the shaft 85 abutting the axial friction wheel hub 86 and is keyed to the shaft 85 by a key 89 with the pulley hub 88 abutting the lower end of the inner sleeve 83; a washer 90 surrounds the threaded upper end of the shaft 85, a snap ring 91 surrounds the shaft 85 below the axial friction wheel hub 86, a nut 92 is threaded on the upper end of the shaft 85 and is locked by suitable means tightened against the snap ring 91 adjacent the other end of the shaft 85 pressing the inner sleeve 83, the pulley hub 88, and the axial friction wheel hub 86 therebetween locking them securely together to provide lateral support for the shaft 85 against lateral thrusts and forces exerted on the spherically faced friction drive wheel 34.

Axial chamber 79 is located in the spherical face of the friction wheel 34 interrupting the face contour of the friction wheel 34 and a freely bearinged or floating plug 112 is disposed in the chamber 79 substantially continuing the spherical face of the friction wheel 34 over the area of its interruption by the chamber 79 while bearing races 93 secured to the end of the shaft 85 and bearing races 94 secured to the hub 77 of plug 112 equipped with ball bearings 78 support the plug 112 relative to the shaft 85 so that said plug is freely rotatably associated relative to the spherically faced friction wheel 34.

Motor 41 is mounted on the friction wheel sleeve 33 by the support 40, Figs. 4, 5, 11, and 12, which comprises a strip of heavy metal reversely folded upon itself having an aperture 95 therein for surrounding the friction wheel sleeve 33 and a slot 96 interrupting the bend 97. A bolt 98 fits in the channel 99 formed by the bend 97 nesting between the friction wheel sleeve 33 and the bend 97 while a nut 100 threaded on the bolt 99 compress the edges of the support defining the aperture 95 against the friction wheel sleeve 33 as permitted by the slot 96 thereby firmly securing the support 40 to the friction wheel sleeve 33. Spacers 101 located between the support 40 dual members 102 and 103, Fig. 5, separate the members 102 and 103 while bolts 104 threaded in the housing 105 of the motor 41 through the spacers 101 support the motor 41 securely and flexibly on the friction wheel sleeve 33 and in such manner to dampen the vibration of the motor 41. A hand throttle lever 104 is mounted on the hand steering lever 28, and a mechanical cable 105 leading from the throttle lever 104 to the motor 41 facilitating operator control of fuel supply to the motor 41.

The wheels 25 mounted on the front wheel forks 23 support the front end of the vehicle. The steering hand lever 28, the control rod hand lever 59 and the throttle lever 104 are located in the front portion of the vehicle just ahead of the seat A shown in dotted lines on Figure 1, so that a person sitting on a seat can readily operate the vehicle. The control rod 56 closely parallels the longitudinal frame member 20 centrally of the vehicle and is adapted to lie between the persons sitting on the seat A.

The rear end of the vehicle is normally supported on the rear wheel 38 via the vertical support 30, the triangulated support 31, the cantilevered stub 70 on the support 31, the support sleeve 32, the friction wheel sleeve 33, the shaft 85, and the spherically faced friction wheel 34; the friction wheel 34 rests on the rear wheel 38 adjacent the top of the rear wheel 38 supporting the rear end of the vehicle via the named associated elements. The rear wheel fork 37 is normally freely bearinged in the horizontal rear wheel fork journal 36, so that the rear wheel fork 37 stabilizes the wheel 38 and the rear end of the vehicle relative to each other without normally supporting the rear end of the vehicle via the rear wheel fork 37.

Figure 8:
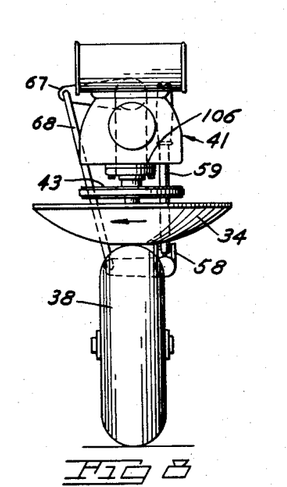
Fig. 8 is a rear elevational diagrammatic view of the driving wheel and driven wheel in neutral position.
Figure 9:
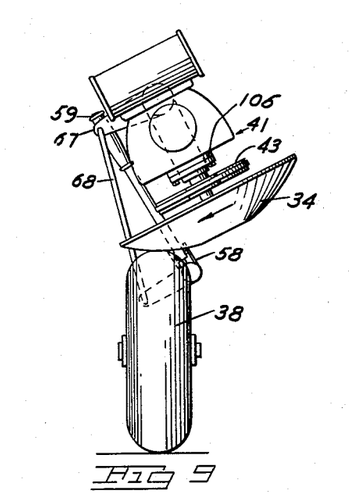
Fig. 9 is a view similar to Fig. 8 showing the driving wheel in forward driving relation to the driven wheel.
Figure 10:
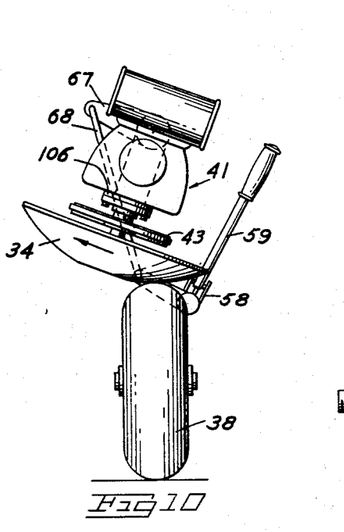
Fig. 10 is a view similar to Fig. 8 showing the driving wheel in reversing relation to the driven wheel.
Figure 11:
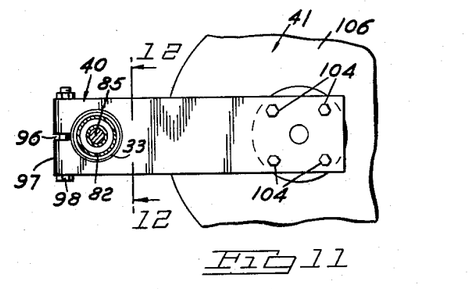
Fig. 11 is a bottom plan view of the motor mounting taken on the line 11—11 of Fig. 5.
Figure 12:
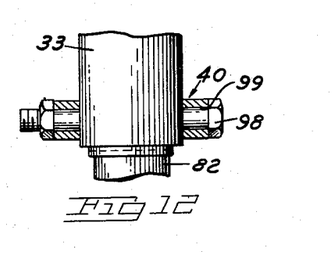
Fig. 12 is a cross-sectional view of Figs. 5 or 11 taken on the line 12—12 thereof.

The support sleeve 32 is adapted to pivot on the stub 70 to vary the spherically faced friction drive wheel 34 relative to the rear wheel 38 facilitating contacting the rear wheel 38 with the center of the drive wheel 34, Figure 8, or at a point spaced from the center of the friction wheel 34 on either side of the friction wheel 34, Figures 9 and 10, to effect forward and reverse powering of the rear wheel 38. The radius of the spherically faced friction drive wheel 34 is preferably the same as the radius upon which the friction drive wheel 34 pivots relative to the stub 70, so that the relation of the spherical face of the friction wheel 34 to the rear wheel 38 remains the same regardless of the point on the friction wheel 34 in contact with the rear wheel 38.

The rear end of the vehicle is optionally supported on the rear wheel 38 via the rear wheel fork 37, the integral rear wheel fork lever 48, the drag link 46, the toggle link 48, the toggle link activating plate 51, the control rod 56, the control rod pin 53, when the control rod hand lever 59 is moved backwardly from the position shown in Figure 1 and indicated by dotted lines in Figure 5, to the position shown in solid lines in Figure 5, so that the ball end 61 of the control rod hand lever 59 is thrust against the control rod pin 53 driving the control rod 56 rearwardly in the vehicle via the clevis 58, moving the toggle plate 51 rearwardly against the roller 49 causing the roller to rise on the plate 51 as the toggle link swings upwardly, thereby elevating the drag link 46 which lifts the end of the rear wheel fork integral lever 45 pivoting the rear wheel fork 37 in the rear wheel fork horizontal journal 36 placing a downward thrust on the rear wheel 38 via the rear wheel fork 37 thereby placing an upward thrust at the rear wheel fork journal 36 which is the fulcrum point for the rear wheel fork lever 45 thereby lifting and supporting the rear end of the vehicle on the rear wheel 38 via the rear wheel fork 37. The upward thrust on the rear end of the vehicle causes the rear end of the vehicle to rise relative to the rear wheel 38 lifting the spherically faced friction drive wheel 34 out of contact and supporting relation with the rear wheel 38.

Lifting the spherically faced friction drive wheel 34 off the rear wheel 38 facilitates traversing the friction wheel 34 relative to the rear wheel 38 via the support sleeve 32, the support sleeve arm 67, the connecting rod 68, the control rod arm 66, the control rod 56, and the control rod hand lever 59 due to the fact that when the control rod hand lever 59 is manually drawn back, as indicated by the solid lines of Figure 5, the control rod brakes 63 and 64 are disassociated permitting rotational movement of the control rod 56, so that the operator can move the control rod hand lever 59 to the right or left, thereby rotating the control rod 56 about the control rod front pin 53 and within the control rod rear journal 55 thereby swinging the control rod arm 66 so that the arm 66 swings the support sleeve arm 67 via the connecting rod 68 to pivot the support sleeve 32 on the support stub 70 so that the support sleeve 32 swings the friction wheel sleeve 33 causing the spherically faced friction drive wheel 34 to traverse either to the right or left relative to the rear wheel 38. It will be noted that when the control rod hand lever 59 is in its forward position as indicated by the solid lines of Figure 1, the control rod spring 65 has driven the control rod 56 forwardly in the vehicle, carrying the brake 64 into contact with the brake 63 enabling the brakes 63 and 64 to lock the control rod 56 against rotational movement. The brake 63 is mounted on the longitudinal frame member 20 via the bracket 62 which is longitudinally variably mounted on the longitudinal frame member 20 facilitating adjusting the brake 63 relative to the brake 64.

A braked, neutral condition exists in the vehicle when the spherically faced friction drive wheel 34 is centrally positioned relative to the rear wheel 38 with the freely rotatable plug 112 set on dead center on the rear wheel 38, Figs. 1 and 8. In this condition the freely rotatable plug 112 supports the weight of the rear end of the vehicle on the rear wheel 38, and, as it is resting on dead center, the plug 112 cannot rotate irrespective of the fact that it is freely disposed on the shaft 85, and the plug 112, therefore, frictionally engages the rear wheel 38 locking the rear wheel 38 against rotation thereby braking the vehicle. However, in this condition, the spherically faced friction wheel 34 is free to rotate with the shaft 85 relative to the friction wheel sleeve 33 and the floating plug 112, providing a neutral position for the friction wheel 34 relative to the rear wheel 38. In this neutral position of the elements of the vehicle drive, the motor 41 can be started and run powering the friction drive wheel without transmitting drive to the rear wheel 38 as the friction drive wheel 34 freely turns about the plug 112.

A neutral coasting or free-wheeling condition exists in the vehicle when the freely rotatably disposed plug 112 is positioned relative to the rear wheel 34 at a point on the plug 112 off the center of the plug 112 relative to the rear wheel 38. In this condition, the plug 112 supports the weight of the rear end of the vehicle on the rear wheel 38 and the rear wheel 38 is free to rotate as the plug 112 is free to rotate. Obviously the motor 41 and friction drive wheel can be running and turning respectively or stationary as desired as the friction drive wheel 34 is not in contact with the rear wheel 38.

A forward drive condition exists in the vehicle, when the direction of rotation of the spherically faced friction wheel 34 is in the direction indicated by the arrow in the various figures, particularly Fig. 9, when the friction wheel 34 is traversed to the right relative to the rear wheel 38 so that the friction wheel 34 drives the top of the rear wheel 38 forwardly and the bottom of the rear wheel 38 backwardly relative to the vehicle thereby imparting forward motion to the vehicle. In this condition the friction wheel 34 supports the rear end of the vehicle on the rear wheel 38, and, if the rear wheel 38 is contacted by the friction wheel 34 adjacent the plug 112, a low ratio driving relation developing high torque and low speed exists between the friction wheel 34 and the rear wheel 38. If the rear wheel 38 is contacted by the friction wheel adjacent its outer periphery, a high ratio driving relation exists between the friction wheel 34 and the rear wheel 38 developing low torque and high speed.

A reverse drive condition exists in the vehicle when the direction of rotation of the spherically faced friction drive wheel 34 is in the direction indicated by the arrow in the various figures, particularly Fig. 10, and when the friction wheel 34 is traversed to the left relative to the rear wheel 38 so that the friction wheel 34 drives the top of the rear wheel 38 rearwardly and the bottom of the rear wheel 38 forwardly relative to the vehicle thereby imparting rearward motion to the vehicle. In this condition, the friction wheel 34 supports the rear end of the vehicle on the rear wheel 38 with the torque and speed ratios being the same as in forward drive. Obviously if the direction of rotation of the spherically faced friction wheel 34 is opposite to the arrow indicated direction of the friction wheel 34, the traversing of the friction wheel 34 relative to the rear wheel 38 is also opposite to that described above. It can readily be seen that the transmitting of power between the friction wheel 34 and the rear wheel 38 is infinitely variable as the friction wheel 34 can be made as large as desired and can contact the rear wheel 38 at any point on the friction wheel 34 between its center and its outer edge.

The rear wheel 38 and the spherically faced friction driving wheel 34 are controlled and operated by the driver in relation to each other and to the rear end of the vehicle through the medium of the control rod 56 and its associated mechanism. The control rod 56 is longitudinally slidably and axially pivotally mounted in the vehicle enabling the control rod 56 to perform simultaneously or separately two individual mechanical functions in conjunction with the control rod hand lever 59 which enables the driver to pivot the control rod 56 and/or slide the control rod 56 rearwardly in the vehicle. The spring 65 is adapted to automatically return the control rod 56 forwardly in the vehicle and the brakes 63 and 64 are adapted to prevent pivoting of the control rod 56 when they are engaged.

Pivoting motion of the control rod 56 is transmitted via the control rod arm 66 in conjunction with the support sleeve 67 and the connecting rod 68 to the support sleeve 32 to traverse the spherically faced friction drive wheel 34 mounted on the support sleeve 32 relative to the rear wheel 38 as indicated in Figs. 9 and 10. Sliding motion of the control rod 56 is transmitted via the control rod toggle activating plate 51, the toggle link 48, the drag link 46, the rear wheel fork lever 45, and the rear wheel fork 37 to lift the rear end of the vehicle relative to the rear wheel 38 whereby supporting the rear end of the vehicle on the rear wheel 38 via the rear wheel fork 37 and thereby lifting the spherically faced friction drive wheel out of supporting relation to the rear end of the vehicle on the rear wheel 38 and clear of contact with the rear wheel 38. Obviously lifting the friction wheel 34 clear of contact with the rear wheel 38 facilitates traversing the friction drive 34 relative to the rear wheel to effect graduated forward and reverse drive.

In driving and operating the vehicle the driver positions the freely floating plug 112 centrally on the rear wheel 38 thereby braking the vehicle and placing the spherically faced friction drive wheel 34 in neutral relation to the rear wheel 38 and then starts the motor 41 so that the friction drive wheel 34 is powered and rotates in the direction indicated by the arrow in the drawings. The driver then pulls rearwardly on the control rod hand lever 59 abutting the balled end 61 thereof against the end of the pivot and slide pin 53 fulcruming the hand lever 59 at its pivot point 60 at the clevis 58 attached to the control rod 56 driving the control rod 56 rearwardly in the vehicle against the control rod return spring 65, disassociating the control rod rotation preventing brakes 63 and 64, moving the toggle activating plate 51 rearwardly against the toggle roller 49 causing the roller 49 to rise on the plate 51 thereby activating the toggle link 48 to elevate the drag link 46 which in turn lifts the rear wheel fork integral lever 45 causing the rear wheel integral fork lever 45 and the rear wheel fork to pivot at the fulcrum supplied by the rear wheel fork horizontal journal 36 placing a downward thrust on the immovable grounded rear wheel 38 and an upward thrust on the movable rear wheel fork journal 36 moving the rear wheel fork journal 36 and the rear end of the vehicle upwardly supported on the rear wheel 38 via the rear wheel fork 37 and lifting the spherically faced friction drive wheel 34 out of supporting relation and contact with the rear wheel 38. To effect forward drive of the vehicle, the driver then moves the control rod hand lever 59 sidewise to the left turning the control rod clevis 58 and the control rod 56 to the left thereby turning the control rod arm 66 downwardly pulling the connection rod 68 downwardly and pulling the support sleeve arm 67 downwardly to rotate the support sleeve 32 to the left thereby traversing the spherically faced friction drive wheel 34 to the right relative to the rear wheel 38 to position the driving surface of the friction wheel 34 over the rear wheel 38. The driver then allows the control rod hand lever 59 to move forwardly under the leverage of the traversed friction wheel 34 and motor 41, the pressure of the toggle 48 against the toggle plate 51, and the drive of the control rod spring 65 so that the friction drive wheel 34 is lowered into driving contact with and supporting relation on the rear wheel 38 with the brakes 63 and 64 engaging to secure the control rod and associated linkage, particularly the friction drive wheel 34, in set traversed condition so that the vehicle is in forward drive. It is advisable to initiate forward drive by traversing the friction wheel 34 to contact the rear wheel 38 adjacent the center of the friction wheel 34 to provide high torque to overcome vehicle inertia. It is also advisable once the vehicle is in motion, to gain momentum and a higher driving ratio, for the driver to pull back slightly on the control rod hand lever 59 sufficiently to disengage the brakes 63 and 64 and then to move the hand lever 59 farther to the left thereby traversing the friction wheel 34 farther to the right relative to the rear wheel 38 with the friction wheel 34 riding up the rear wheel 38 to a point on the friction wheel 34 adjacent its outermost edge. The driver then allows the control rod hand lever 59 to move forwardly to engage the brakes 63 and 64 so that the adjusted position is secured. Obviously the spherically faced friction wheel 34 can be "riden" off the free floating center plug 112 onto the driving surface of the friction wheel 34 to initiate forward drive. It is also obvious that to drive the vehicle rearwardly, the control rod hand lever 59 is turned to the right to traverse the friction wheel 34 to the left relative to the rear wheel 38. The trottle lever 104 is manipulated as the usual vehicle accelerator pedal.

To decrease vehicle speed the linkage is operated in a manner reversely to the above described manner of increasing vehicle speed. To "free wheel" the moving vehicle the operator positions the free-floating plug 112 on the rear wheel adjacent its outermost edge, so that the rear wheel 38 and the free-floating plug 112 move freely and independently of the drive wheel 34 and the drive wheel moves or remains static relative to the rear wheel 38 and free-floating plug 112. To brake the vehicle, the driver positions the plug 112 on dead center on the rear wheel 38 so that the free-floating plug 112 is incapable of rotation providing a stationary brake relative to the rear wheel 38.

The general proportions and relationship of the various elements of the inventive vehicle indicated in the drawing and described herein are desirable to the proper functioning of the invention. Although the invention has been described as a vehicle, obviously the elements of the invention may be used for non-vehicular variable transmission of power.

While hand operating controls have been shown and described throughout to illustrate that the vehicle can easily be operated by a person deprived of the use of his legs, it is obvious that foot operating controls can be adapted to the control rod and associated parts or to the separate parts.

While the member 37 has been referred to throughout the specification as a wheel fork, it is to be understood that any pivotally mounted support member is usable instead of a fork to accomplish the purpose of the member 37 such as a brace or support.

Although but a single embodiment of the invention has been disclosed and described in detail, it is obvious that many changes may be made in the size, shape, detail, and arrangements of the elements of the invention within the scope of the appended claims.

I claim:

1. A mounting for a friction drive wheel comprising a pivotally mounted support to facilitate oscillating the drive wheel relative to a driven wheel, a housing welded to said support at an angle thereto, a freely bearinged sleeve disposed in said housing, a shaft secured to said sleeve, a pulley keyed to said shaft abutting said sleeve, and a friction drive wheel abutting said pulley keyed to said shaft; said sleeve, shaft, pulley and friction drive wheel being adapted to freely rotate relative to said housing.

2. In a device as set forth in claim 1, a bracket extending from said housing, a motor mounted on said bracket adapted to oscillate with said housing when said housing oscillates and a belt drivingly connecting said motor pulley with said shaft pulley for transmitting drive between said motor and said friction drive member.

3. A vehicle comprising a chassis, a wheel fork pivotally mounted adjacent to the end of said chassis for free up and down movement, a wheel rotatably mounted on said fork, supports on said chassis extending upwardly from said chassis over said wheel, a friction drive wheel swingably disposed on said supports adapted to bear on said wheel to support the end of said chassis adjacent said wheel, a lever extending from said fork, and means associated with said lever to pivot said fork relative to said chassis to disassociate said friction drive wheel and said wheel and to support the end of said chassis adjacent said wheel on said wheel via said fork.

4. A vehicle comprising a chassis, a wheel fork pivotally mounted adjacent to the end of said chassis for free up and down movement but longitudinally and laterally supported, a wheel rotatably mounted on said fork, supports on said chassis extending upwardly from said chassis adjacent said wheel, a friction drive wheel disposed on said supports adapted to bear on said wheel to support the end of said chassis adjacent said wheel, a lever extending from said fork, a drag link connected to the end of said lever, a toggle link connected to the end of said drag link and pivotally mounted on said chassis, and a control rod adapted to activate said toggle link to lift said drag link to operate said lever to move said friction drive member out of vehicle supporting relationship on said wheel.

5. A vehicle comprising a chassis, a wheel support pivotally disposed relative to one end of said chassis for up and down movement, a wheel rotatably disposed relative to said support, a superstructure on said chassis, a member pivotally disposed on said superstructure, a friction drive wheel rotatably mounted on said member adapted to bear on said wheel in driving relation thereto and to support the end of said chassis adjacent said wheel by bearing on said wheel, a control torque rod, an arm extending from said torque rod, an arm on said member, a connecting rod between said arms, and a hand lever on said control rod adapted to pivot said rod to activate said arms to pivot said member to traverse said friction drive wheel relative to said wheel to change the driving ratio therebetween and to effect forward and reverse drive therebetween.

6. A vehicle comprising a chassis, a wheel support member pivoted for free up and down movement adjacent one end of said chassis, a wheel mounted on said support for free rotation relative thereto, a superstructure mounted on said chassis, a member mounted on said superstructure for free oscillating movement relative thereto, a friction drive member mounted on said oscillating member for free relative rotation relative thereto and adapted to bear on said wheel to support the end of said chassis adjacent to said wheel, an arm on said oscillating member, a slidable and rotatable control rod mounted on said chassis, an arm mounted on said control rod, a connecting rod between said arms, a lever extension on said wheel support, a drag link connected to the end of said wheel support lever, a toggle link pivotally mounted on said chassis connected to said drag link, a face plate on said control rod adapted to move said toggle link, a combination pivot and bearing point adjacent the forward end of said control rod, a hand lever fulcrumed on said rod adapted to contact said bearing point; said hand lever being adapted to move said rod rearwardly to carry said face plate rearwardly against said toggle link to cause said toggle link to move said drag link to operate said wheel support lever to lift said chassis adjacent said wheel relative to said wheel and to lift said friction drive member out of supporting relation to said wheel; said hand control rod lever being capable of pivoting said rod to operate said arms to oscillate said oscillatable member to traverse said friction drive wheel relative to said wheel to effect variable forward and rearward driving relation between said friction drive wheel and said wheel.

7. In a power and transmission unit, a support member, a support sleeve pivotally mounted on said support member, a friction wheel sleeve secured to said support sleeve adapted to traverse in an arc when said support sleeve pivots, a shaft disposed in said friction wheel sleeve, a friction wheel disposed on said shaft having a spherical face struck substantially on a radius from the pivot center of said support sleeve, a wheel positioned relative to said support member and relative to said friction wheel in friction contact with said friction wheel so as to be driven thereby and so that pivoting said support sleeve traverses said friction wheel sleeve and said friction wheel relative to said wheel to effect graduated forward and reverse speeds.

8. In a power and transmission unit, a support member, a support sleeve pivotally mounted on said support member, a friction wheel sleeve secured to said support sleeve adapted to traverse in an arc when said support sleeve pivots, a shaft disposed in said friction wheel sleeve, a friction wheel disposed on said shaft having a spherical face struck substantially on a radius from the pivot center of said support sleeve, a wheel positioned relative to said support member and relative to said friction wheel in friction contact with said friction wheel so as to be driven thereby and so that pivoting said support sleeve traverses said friction wheel sleeve and said friction wheel relative to said wheel to effect graduated forward and reverse speeds; said spherically faced friction wheel having an axial cavity; and a freely rotatable plug in said cavity axially aligned with said friction wheel providing a brake relative to said wheel when centrally positioned thereon and a free-wheeling unit when positioned off center thereon.

9. In a power and transmission unit, a support member, a support sleeve pivotally mounted on said support member, a friction wheel sleeve secured to said support sleeve adapted to traverse in an arc when said support sleeve pivots, a shaft disposed in said friction wheel sleeve, a friction wheel disposed on said shaft having a spherical face struck substantially on a radius from the pivot center of said support sleeve, a wheel positioned relative to said support member and relative to said friction wheel in friction contact with said friction wheel so as to be driven thereby and so that pivoting said support sleeve traverses said friction wheel sleeve and said friction wheel relative to said wheel to effect graduated forward and reverse speed; said spherically faced friction wheel having an axial cavity; a freely rotatable plug in said cavity axially aligned with said friction wheel providing a brake relative to said wheel when centrally positioned thereon and a free-wheeling unit when positioned off center thereon, and means for traversing said spherically faced friction wheel relative to said wheel.

10. A vehicle, support, power, and transmission unit comprising a vehicle chassis, a horizontally hinged wheel brace on said chassis, a wheel disposed on said wheel brace, a support on said chassis, a support sleeve pivotally mounted on said support, a friction wheel sleeve secured to said support sleeve adapted to traverse in an arc when said support sleeve pivots, a shaft disposed in said friction wheel sleeve, and a spherically faced friction wheel disposed on said shaft; the radius of the face of said friction wheel being substantially equal to the radius upon which said friction wheel traverses with said friction wheel sleeve on said support sleeve; said friction wheel being adapted to contact and bear upon said wheel to support said chassis adjacent said wheel and said hinged wheel brace.

11. A vehicle, support, power, and transmission unit comprising a vehicle chassis, a horizontally hinged wheel brace on said chassis, a wheel disposed on said wheel brace, a support on said chassis, a support sleeve pivotally mounted on said support, a friction wheel sleeve secured to said support sleeve adapted to traverse in an arc when said support sleeve pivots, a shaft disposed in said friction wheel sleeve, a spherically faced friction wheel diposed on said shaft; the radius of the face of said friction wheel being substantially equal to the radius upon which said friction wheel traverses with said friction wheel sleeve on said support sleeve; said friction wheel being adapted to contact and bear upon said wheel to support said chassis adjacent said wheel and said hinged wheel brace, and means capable of activating said lever to place a downward thrust on said wheel and an upward thrust on said chassis via said hinged wheel brace, respectively to support said chassis adjacent said wheel on said wheel via said hinged wheel brace to support said chassis adjacent said wheel on said wheel via said brace and respectively to lift said spherically faced friction drive wheel out of contact with said wheel to facilitate traversing said friction wheel relative to said wheel.

12. A vehicle, support, power, and transmission unit comprising a vehicle chassis, a horizontally hinged wheel brace on said chassis, a wheel disposed on said wheel brace, a support on said chassis, a support sleeve pivotally mounted on said support, a friction wheel sleeve secured to said support sleeve adapted to traverse in an arc when said support sleeve pivots, a shaft disposed in said friction wheel sleeve, a spherically faced friction wheel disposed on said shaft; the radius of the face of said friction wheel being substantially equal to the radius upon which said friction wheel traverses with said friction wheel sleeve on said support sleeve; said friction wheel being adapted to contact and bear upon said wheel to support said chassis adjacent said wheel and said hinged wheel brace; a lever on said hinged wheel brace, means capable of activating said lever to place a downward thrust on said wheel and an upward thrust on said chassis via said hinged wheel brace, respectively to support said chassis adjacent said wheel on said wheel via said brace and respectively to lift said spherically faced friction drive wheel out of contact with said wheel to facilitate traversing said friction wheel relative to said wheel and means for traversing said friction wheel relative to said wheel.

13. A vehicle, support, power, and transmission unit comprising a vehicle chassis, a horizontally hinged wheel brace on said chassis, a wheel disposed on said wheel brace, a support on said chassis, a support sleeve pivotally mounted on said support, a friction wheel sleeve secured to said support sleeve adapted to traverse in an arc when said support sleeve pivots, a shaft disposed in said friction wheel sleeve, a spherically faced friction wheel disposed on said shaft; said friction wheel being adapted to contact and bear upon said wheel to support said chassis adjacent said wheel and said hinged wheel brace, a lever on said hinged wheel brace, a drag link on said lever, a toggle link adapted to lower and raise said drag link, a plate adapted to activate said toggle link, a control rod adapted to move said plate to activate said toggle link whereby said toggle link is able to lower and raise said lever via said drag link to release or place a downward thrust on said wheel and an upward thrust on said chassis via said hinged wheel brace, respectively to support said chassis adjacent said wheel on said wheel via said brace and respectively to lift said spherically faced friction drive wheel out of chassis supporting and friction contact with said wheel to facilitate traversing said friction wheel relative to said wheel.

14. A vehicle, support, power, and transmission unit comprising a vehicle chassis, a horizontally hinged wheel brace on said chassis, a wheel disposed on said wheel brace, a support on said chassis, a support sleeve pivotally mounted on said support, a friction wheel sleeve secured to said support sleeve adapted to traverse in an arc when said support sleeve pivots, a shaft disposed in said friction wheel sleeve, a spherically faced friction wheel disposed on said shaft; said friction wheel being adapted to contact and bear upon said wheel to support said chassis adjacent said wheel and said hinged wheel brace, a lever on said hinged wheel brace, a drag link on said lever, a toggle link adapted to lower and raise said drag link, a plate adapted to activate said toggle link, a control rod adapted to move said plate to activate said toggle link whereby said toggle link is able to lower and raise said lever via said drag link to release or place a downward thrust on said wheel and an upward thrust on said chassis via said hinged wheel brace, respectively to support said chassis adjacent said wheel on said wheel via said brace and respectively to lift said spherically faced friction drive wheel out of chassis supporting and friction contact with said wheel to facilitate traversing said friction wheel relative to said wheel; an arm on said control rod, an arm on said support sleeve, and a connecting rod between said arms; said control rod being adapted to pivot to move said control rod arm, said connecting rod, and said support sleeve arm to pivot said support sleeve to traverse said friction wheel relative to said wheel.

LEO J. WUBBE.

REFERENCES CITED

The following references are of record in the file of this patent:

UNITED STATES PATENTS

| Number | Name | Date |
|---|---|---|
| 768,114 | Dean | Aug. 23, 1904 |
| 889,679 | Hatfield | June 2, 1908 |
| 910,768 | Anderson | Jan. 26, 1909 |
| 1,122,341 | Welch et al. | Dec. 29, 1914 |
| 1,181,218 | Fullerton | May 2, 1916 |
| 1,394,328 | Miller | Oct. 18, 1921 |
| 1,478,966 | Lanchester | Dec. 25, 1923 |

FOREIGN PATENTS

| Number | Country | Date |
|---|---|---|
| 8,304 | Great Britain | Nov. 26, 1908 |
| 166,017 | Great Britain | July 14, 1921 |